US012684247B2

(12) United States Patent　　　(10) Patent No.: US 12,684,247 B2

Sugaya　　　(45) Date of Patent: Jul. 14, 2026

(54) APPARATUS, COMMUNICATION SYSTEM, METHOD, AND STORAGE MEDIUM FOR CONTROLLING EXPOSURE OF IMAGING APPARATUS

(71) Applicant: CANON KABUSHIKI KAISHA, Tokyo (JP)

(72) Inventor: Atsuto Sugaya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 118 days.

(21) Appl. No.: 18/632,153

(22) Filed: Apr. 10, 2024

(65) Prior Publication Data

US 2024/0348932 A1　　　Oct. 17, 2024

(30) Foreign Application Priority Data

Apr. 13, 2023　　(JP) ................................. 2023-065623

(51) Int. Cl.
| | |
|---|---|
| *H04N 23/73* | (2023.01) |
| *H04N 23/63* | (2023.01) |
| *H04N 23/71* | (2023.01) |
| *H04N 23/80* | (2023.01) |

(52) U.S. Cl.
CPC ........... *H04N 23/73* (2023.01); *H04N 23/631* (2023.01); *H04N 23/71* (2023.01); *H04N 23/80* (2023.01)

(58) Field of Classification Search
CPC ...... H04N 23/73; H04N 23/632; H04N 23/80; H04N 23/72; H04N 23/71; H04N 23/75
See application file for complete search history.

(56) References Cited

U.S. PATENT DOCUMENTS

2024/0223908 A1* 7/2024 Lu ......................... H04N 23/73

FOREIGN PATENT DOCUMENTS

JP　　　　2018152787 A　*　9/2018　............. H04N 23/69

* cited by examiner

*Primary Examiner* — Lin Ye
*Assistant Examiner* — Steven Daniel Barry
(74) *Attorney, Agent, or Firm* — Canon U.S.A., Inc. IP Division

(57) ABSTRACT

A control apparatus includes at least one processor performing operations as follows: outputting instruction information to an imaging apparatus, the instruction information including (a) an instruction to make a transition of a imaging range of the imaging apparatus from a first range to a second range, and (b) a target value of each brightness parameter at time of imaging in the second range.

14 Claims, 10 Drawing Sheets

APPARATUS, COMMUNICATION SYSTEM, METHOD, AND STORAGE MEDIUM FOR CONTROLLING EXPOSURE OF IMAGING APPARATUS

BACKGROUND

Technical Field

The aspect of the embodiments relates to an imaging apparatus, a communication system, a control method, and a storage medium.

Description of the Related Art

At a video production site, conventionally, there has been a case where framing a composition appropriate for an object is performed while a continuous change of an imaging setting is required at the same time to add intended video effects. This requires an operator to have a high-level skill.

To simplify an operation of the operator, there is a technique of preliminarily registering a continuous change of the imaging setting before imaging to enable calling of the change of the imaging setting during imaging. Japanese Patent Application Laid-Open No. 2018-152787 discusses a technique of preliminarily registering a continuous change regarding an in-focus position and an angle of view to simplify the operation of the operator.

Meanwhile, at an imaging site in recent years, opportunities for using a remote-control camera that can be remotely operated by the operator has increased. Examples of the remote-control camera include a remote-control camera having a pan/tilt/zoom (PTZ) function to enable a change of an imaging range with the remote-control camera. In addition, there is a remote-control camera having a preset function that enables preliminary registration of a transition command for making a transition of the imaging range, and furthermore, that enables preliminary registration of transition speed or transition time between a plurality of preliminarily registered imaging ranges.

SUMMARY

According to an aspect of the embodiments, a control apparatus configured to control an imaging apparatus includes at least one processor, and a memory coupled to the at least one processor, the memory storing instructions that, when executed by the at least one processor, cause the at least one processor to: change an imaging range of the imaging apparatus, control a plurality of brightness parameters to determine brightness of images captured by the imaging apparatus, store instruction information including (a) an instruction to make a transition of the imaging range from a first range to a second range, and (b) a target value of each brightness parameter at time of imaging performed by the imaging apparatus in a case where the imaging range is the second range, and in a case where there is a difference between at least one brightness parameter at the time of imaging in the first range and the stored target value of the at least one brightness parameter, monotonically approximate the at least one brightness parameter to the target value while maintaining speed of fluctuations in the brightness of the captured images to be constant in a whole of or a partial period of time to make the transition of the imaging range from the first range to the second range.

Further features of the disclosure will become apparent from the following description of exemplary embodiments with reference to the attached drawings.

DESCRIPTION OF THE EMBODIMENTS

Exemplary embodiments for implementing the disclosure will be described in detail below with reference to the accompanying drawings. The exemplary embodiments described below are merely examples of a means for implementing the disclosure, and should be modified or changed as appropriate depending on a configuration of an apparatus to which the disclosure is applied and various kinds of conditions, and the disclosure is not limited to the exemplary embodiments described below.

Figure 1:
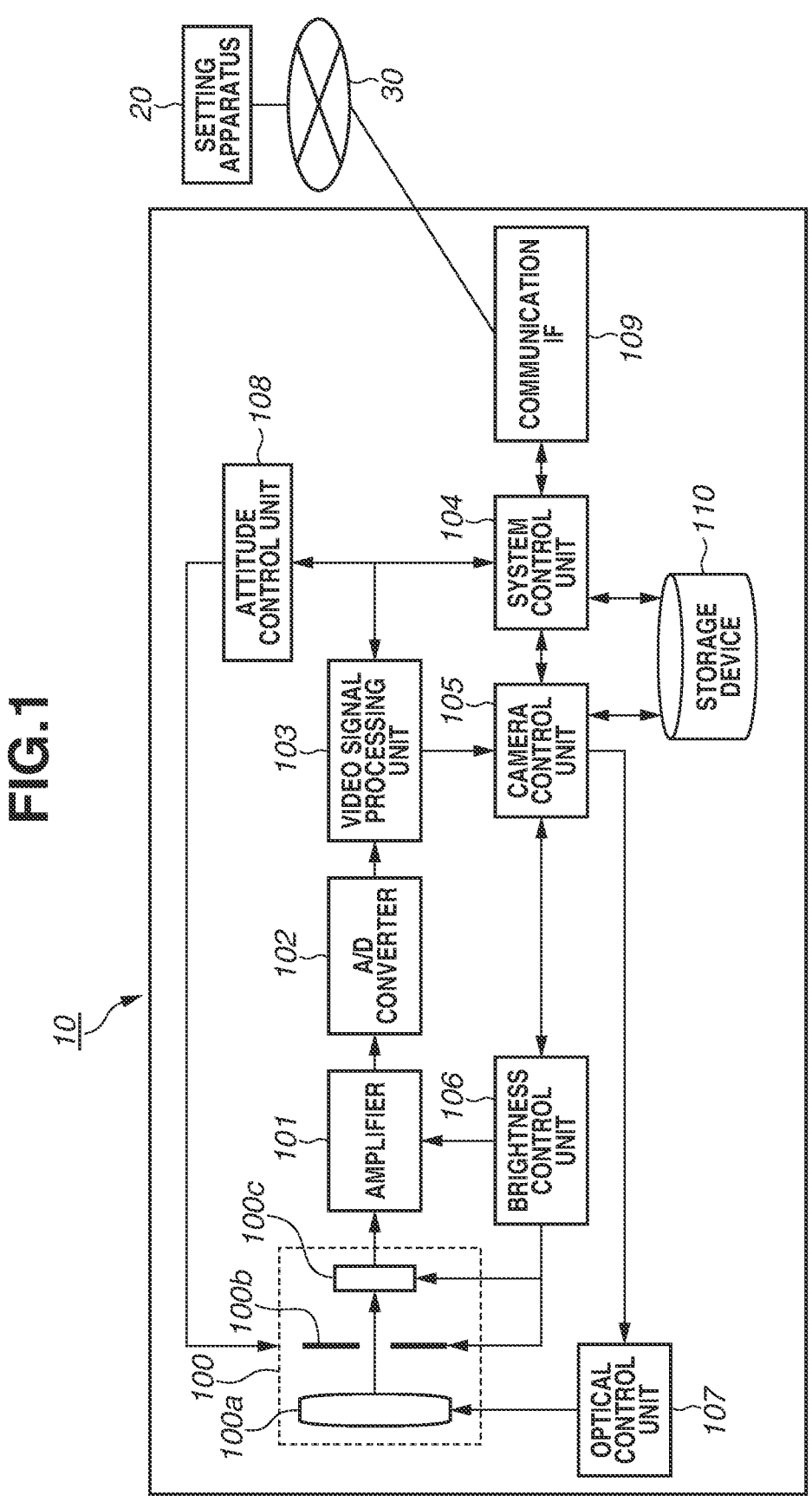
FIG. 1 is a block diagram illustrating a communication system according to a first exemplary embodiment of the disclosure.

Configuration of Communication System According to First Exemplary Embodiment As illustrated in FIG. 1, a communication system according to a first exemplary embodiment of the disclosure includes an imaging apparatus 10, a setting apparatus 20, and a network 30. The communication system according to the present exemplary embodiment can also be referred to as an imaging system.

The imaging apparatus 10 is, for example, a camera used at a video production site. However, the imaging apparatus 10 may be a monitoring camera. The imaging apparatus 10 has a pan/tilt/zoom (PTZ) function, and an imaging range for the PTZ function can be changed.

The setting apparatus 20 mutually communicates with the imaging apparatus 10 via the network 30 and gives an instruction to operate the imaging apparatus 10 to the imaging apparatus 10. The setting apparatus 20 may be a general-purpose computer, or may be a dedicated controller.

The network 30 to which the imaging apparatus 10 and the setting apparatus 20 are connected may be the Internet or an intranet. Alternatively, the network 30 may be a wireless network or may be a wired network.

Alternatively, the setting apparatus 20 may be directly connected to the imaging apparatus 10 and be capable of communicating with the imaging apparatus 10.

The setting apparatus 20 supplies a preliminarily set (preset) imaging setting instruction to the imaging apparatus 10. An operator is able to generate the imaging setting instruction with the setting apparatus 20, and transmit the imaging setting instruction to the imaging apparatus 10 using the setting apparatus 20. The imaging setting instruction includes an imaging range change instruction to give an instruction to change an imaging range and a focusing instruction, and a brightness instruction.

The imaging range change instruction corresponds to the PTZ function, and is used to give an instruction to make a transition of a pan angle, a transition of a tilt angle, and a transition of a zoom lens to the imaging apparatus 10. The pan angle is an orientation of the imaging apparatus 10 in a horizontal direction, and the tilt angle is an orientation of the imaging apparatus 10 in a perpendicular direction. The position of the zoom lens, that is, a focal length of zooming corresponds to an angle of view of the imaging apparatus 10.

The focusing instruction corresponds to the position of a focus lens of the imaging apparatus 10, and is used to give an instruction to make a transition of the position of the focus lens to the imaging apparatus 10.

The brightness instruction corresponds to at least an f-stop number, a shutter value, and a gain value, and is used to give an instruction to make a transition of the f-stop number, a transition of the shutter value, and a transition of the gain value to the imaging apparatus 10. The brightness instruction may be an instruction to switch a neutral density (ND) filter used in the imaging apparatus 10 given to the imaging apparatus 10.

In the imaging setting instruction, each imaging range (a target value of the pan angle, a target value of the tilt angle, and a target value of the position of the zoom lens), a target value of the position of the focus lens in the imaging range, and respective target values of the f-stop number, the shutter value, and the gain value in the imaging range are associated with one another. In a case where the switching of the ND filter is included in the brightness instruction, each imaging range, the target value of the position of the focus lens in the imaging range, and the respective target values of the f-stop number, the shutter value, the gain value, and the ND filter to be used in the imaging range are associated with one another.

That is, various kinds of parameters are associated with one instructed imaging range as a set. A set of each imaging range and parameters is referred to as a "group of imaging settings". The f-stop number, the shutter value, the gain value, and the ND filter to be used are referred to as "brightness parameters".

The imaging setting instruction is used to further give at least one of an instruction regarding time required to make a transition of the imaging range or an instruction regarding speed at the time of making the transition of the imaging range to the imaging apparatus 10. That is, the imaging setting instruction is used to give at least one of the instruction regarding time required to make the transition from an imaging range to a subsequent imaging range or the instruction regarding speed at the time of making the transition to the imaging apparatus 10. At least one of the time or the speed is designated for every time the transition of the imaging range is made.

In addition, the operator uses the setting apparatus 20 to transmit the transition command for making notification about a timing of the start of the transition to the imaging apparatus 10.

The imaging apparatus 10 includes a barrel unit 100, an amplifier 101, an analog/digital (A/D) converter 102, a video signal processing unit 103, a system control unit 104, a camera control unit 105, a brightness control unit 106, an optical control unit 107, and an attitude control unit 108. The imaging apparatus 10 further includes a communication interface (IF) 109 and a storage device 110.

The barrel unit 100 includes a lens group 100*a*, a diaphragm 100*b*, and an image pickup element 100*c*.

The lens group 100*a* is an optical system that forms an image on the image pickup element 100*c* from light incident from an object. The lens group 100*a* includes a focus lens for performing focusing on the object, a zoom lens for adjusting an angle of view, and the like.

The diaphragm 100*b* is used to adjust a quantity of light incident on the image pickup element 100*c* via the lens group 100*a*.

The image pickup element 100*c* is, for example, a complementary metal-oxide semiconductor (CMOS) image sensor or a charge-coupled device (CCD) image sensor. The image pickup element 100*c* converts an object image formed by the lens group 100*a* into an analog image signal.

The amplifier 101 performs amplification processing on an electric signal output from the image pickup element 100*c* to adjust luminance of the analog image signal. An amplification factor (gain value) of the amplifier 101 is variable.

The A/D converter 102 converts the analog image signal subjected to the amplification processing by the amplifier 101 into a digital image signal.

The video signal processing unit 103, the system control unit 104, the camera control unit 105, the brightness control unit 106, and the optical control unit 107 are implemented by, for example, a processor such as a central processing unit (CPU). Specifically, the processor executes a program read out from the storage device 110 or another memory device, which is not illustrated, to implement functions of the video signal processing unit 103, the system control unit 104, the camera control unit 105, the brightness control unit 106, and the optical control unit 107.

The video signal processing unit 103, the system control unit 104, the camera control unit 105, the brightness control unit 106, and the optical control unit 107 may be implemented by individual processors. Alternatively, the video signal processing unit 103, the system control unit 104, the camera control unit 105, the brightness control unit 106, and the optical control unit 107 may be implemented by one processor.

The video signal processing unit 103 performs various kinds of image processing including noise reduction processing and gamma correction processing on the digital image signal converted by the A/D converter 102 to generate an output image signal. In addition, the video signal processing unit 103 records luminance distribution information, a predetermined statistics amount regarding luminance, and the like, each of which is calculated from the digital image signal, in the storage device 110. That is, the video signal processing unit 103 records information regarding brightness of the captured image in the storage device 110.

The system control unit 104 is capable of mutually communicating with the setting apparatus 20 via the communication IF 109.

The system control unit 104 may store the output image signal generated by the video signal processing unit 103 in the storage device 110, or transmit the output image signal to the setting apparatus 20 via the communication IF 109. Furthermore, the system control unit 104 may supply the output image signal to a display device, which is not illustrated, and display an image on the display device.

The system control unit 104 stores the imaging setting instruction (including a plurality of groups of imaging settings) preliminarily set by the setting apparatus 20, as preliminarily set information, in the storage device 110, and supplies the imaging setting instruction to the video signal processing unit 103 and the camera control unit 105. In this case, the system control unit 104 may read out a group of imaging settings required to make a commanded transition in response to the reception of the transition command from the setting apparatus 20, and supply the group of imaging settings to the video signal processing unit 103 and the camera control unit 105.

In addition, the system control unit 104 determines the respective control values of the pan and tilt angles at every predetermined control cycle based on the pan angle and the tilt angle in the imaging setting instruction, and supplies the respective control values of the pan and tilt angles to the camera control unit 105.

Additionally, in a case where the imaging setting instruction includes both the instruction regarding time required to make the transition of the imaging range and the instruction regarding speed at the time of making the transition of the imaging range, the system control unit 104 supplies time and speed to the camera control unit 105. In a case where the imaging setting instruction includes one of the instruction regarding time required to make the transition of the imaging range and the instruction regarding speed at the time of making the transition of the imaging range, the system control unit 104 calculates the other of the time and speed from the instructed one of the time and speed, and supplies calculated values to the camera control unit 105.

The imaging setting instruction is supplied from the system control unit 104 to the camera control unit 105, and each of the luminance distribution information and the predetermined statistics amount regarding luminance is supplied from the video signal processing unit 103 to the camera control unit 105. In addition, the respective control values of the pan and tilt angles and the time and speed at the time of making the transition are supplied from the system control unit 104 to the camera control unit 105.

The camera control unit 105 calculates various control values regarding imaging at every predetermined control cycle based on the imaging setting instruction, the luminance distribution information, the predetermined statistics amount regarding luminance, and the time required to make the transition. The various control values calculated by the camera control unit 105 include an f-stop number of the diaphragm 100$b$, charge accumulation time (corresponding to a shutter value) in the image pickup element 100$c$, a gain of the amplifier 101, the position of the focus lens, and the position of the zoom lens.

The group of imaging settings in the imaging setting instruction is a discrete parameter (controlled at a long time-interval) corresponding to each imaging range. In contrast, the control values calculated by the system control unit 104 and the camera control unit 105 are parameters controlled at a predetermined shorter control cycle.

The brightness control unit 106 drives a driver and a motor, which are not illustrated, based on the control values (the f-stop number, the charge accumulation time, and the gain) calculated by the camera control unit 105 to control the diaphragm 100$b$, the charge accumulation time in the image pickup element 100$c$, and the gain of the amplifier 101. That is, the brightness control unit 106 controls a plurality of brightness parameters that determines the brightness of images.

The optical control unit 107 drives the driver and the motor, which are not illustrated, based on the control values (the position of the focus lens and the position of the zoom lens) calculated by the camera control unit 105 to control the lens group 100$a$. The optical control unit 107 controls the position of the focus lens to perform focusing, and controls the position of the zoom lens to change the imaging range of images.

The attitude control unit 108 drives the driver and the motor, which are not illustrated, based on the control values (the pan angle and the tilt angle) calculated by the system control unit 104 to perform attitude control on the barrel unit 100. The attitude control unit 108 performs the attitude control on the barrel unit 100, whereby the imaging range of images is changed. In the present exemplary embodiment, the attitude control unit 108 performs, as the attitude control, panning and tilting of the barrel unit 100. However, the attitude control unit 108 may roll the barrel unit 100 and cause the barrel unit 100 to linearly move in the horizontal direction and the perpendicular direction.

Brightness Control Processing According to First Exemplary Embodiment

The brightness control processing executed in the imaging apparatus 10 is now described with reference to FIG. 2.

In step S201, the system control unit 104 stores the imaging setting instruction supplied from the setting apparatus 20 in the storage device 110 as the preliminary setting information (preset information). As described above, the imaging setting instruction includes the imaging range change instruction, the focusing instruction, and the brightness instruction, and further includes at least one of the instruction regarding time required to make the transition of the imaging range or the instruction regarding speed at the time of making the transition of the imaging range. In the example in FIG. 2, assume that the imaging setting instruction includes the instruction regarding speed at the time of making the transition of the imaging range.

As described above, the imaging setting instruction includes the plurality of groups of imaging settings. Each group includes the imaging range in which imaging should be performed, the target value of the position of the focus lens, and the target value of the brightness parameter that determines the brightness of images. The imaging range includes the target value of the pan angle, the target value of the tilt angle, and the target value of the position of the zoom lens.

In step S202, the system control unit 104 determines whether the transition command to make notification about a timing of the start of the transition to the preliminarily set imaging range has been received from the setting apparatus 20. In a case where the system control unit 104 determines that the transition command has been received (YES in step S202), the processing proceeds to step S203. In a case where the system control unit 104 determines that the transition command has not been received (NO in step S202), the processing returns to step S202.

In step S203, the system control unit 104 calculates the time required to make the transition of the imaging range from the speed at the time of making the transition instructed by the imaging setting instruction, a difference between the present pan angle and the target value of the pan angle, a difference between the present tilt angle and the target value of the tilt angle, and a difference between the present position of the zoom lens and the target value of the position of the zoom lens. The target value of the pan angle, the target value of the tilt angle, and the target value of the position of the zoom lens are instructed by the group of imaging settings that should be implemented in response to the transition command. Additionally, the system control unit 104 supplies the calculated time required to make the transition of the imaging range, together with the group of imaging settings that should be implemented in response to the transition command, to the camera control unit 105. Thereafter, the processing proceeds to step S204.

However, in a case where the imaging setting instruction includes the instruction regarding the time required to make the transition of the imaging range, the calculation of the time in step S203 is not necessary. Thus, the system control unit 104 supplies the time required to make the transition of the imaging range instructed by the imaging setting instruction, together with the group of imaging settings that should be implemented in response to the transition command, to the camera control unit 105. Then, the processing proceeds to step S204.

In a case where the imaging setting instruction includes the instruction regarding the time required to make the transition of the imaging range but does not include the instruction regarding the speed at the time of making the transition of the imaging range, the system control unit 104 calculates the speed from the time. The system control unit 104 then supplies the calculated time, together with the group of imaging settings that should be implemented in response to the transition command, to the camera control unit 105. Then, the processing proceeds to step S204.

In step S204, the camera control unit 105 generates a zoom control curve from the present position of the zoom lens and the target value of the position of the zoom lens instructed by the group of imaging settings. To generate the zoom control curve is to determine a control value of the position of the zoom lens at every predetermined short control cycle. In this case, the camera control unit 105 determines the control value of the position of the zoom lens at every predetermined control cycle so that the movement of the zoom lens can be completed within the time that is required to make the transition of the imaging range and that is calculated in step S203 (or the time instructed by the imaging setting instruction).

Additionally, in step S204, the camera control unit 105 generates a focus control curve from the present position of the focus lens and the target value of the position of the focus lens instructed by the group of imaging settings. To generate the focus control curve is to determine the control value of the position of the focus lens at every predetermined control cycle described above. In this case, the camera control unit 105 determines the control value of the position of the focus lens at every predetermined control cycle so that the movement of the focus lens can be completed within the time that is required to make the transition of the imaging range and that is calculated in step S203 (or the time instructed by the imaging setting instruction).

In step S205, the camera control unit 105 determines whether there is a difference between the brightness parameter applied to imaging in the present imaging range and the target value of the brightness parameter instructed by the brightness instruction in the group of imaging settings. In a case where there is no difference (NO in step S205), the processing proceeds to step S206. In a case where there is a difference (YES in step S205), the processing proceeds to step S207.

In step S206, the system control unit 104 determines the respective control values of the pan and tilt angles at every predetermined cycle described above from the pan angle and the tilt angle regarding the present imaging range, and the respective target values of the pan and tilt angles instructed by the group of imaging settings. In this case, the system control unit 104 determines the respective control values of the pan and tilt angles at every predetermined control cycle so that the attitude control unit 108 can complete the attitude control within the time that is required to make the transition of the imaging range and that is calculated in step S203 (or the time instructed by the imaging setting instruction). The system control unit 104 then sequentially supplies the respective control values of the pan and tilt angles to the attitude control unit 108 at the predetermined control cycle intervals.

Additionally, in step S206, the camera control unit 105 sequentially supplies the respective control values of the positions of the zoom and focus lenses, which have been determined in step S204, to the optical control unit 107 at the predetermined control cycle intervals.

In this manner, the imaging range is changed from the present imaging range to the subsequent imaging range, and also focusing that is adapted into the subsequent imaging range is performed.

However, in step S206, feedback control to change the imaging range and perform the focusing may be executed, and the above-mentioned control values may be sequentially corrected by the feedback control.

Meanwhile, in step S207, the camera control unit 105 generates a brightness control curve to maintain speed of fluctuations in brightness of captured images to be constant even if the imaging range is changed. To generate the brightness control curve is to determine the control value of the brightness parameter at every predetermined cycle so that the present brightness parameter determined to have a difference in step S205 is approximated to the target value of the brightness parameter.

In this case, the camera control unit 105 determines the control value of the brightness parameter at every predetermined control cycle so that the change of the brightness parameter to the target value is completed within the time that is required to make the transition of the imaging range and that is calculated in step S203 (or the time instructed by the imaging setting instruction). The camera control unit 105 approximates the brightness parameter to the target value monotonically, that is, gradually, so that the brightness of images to be captured does not fluctuate abruptly.

In step S208, the imaging range is changed and focusing is performed similarly to step S206.

At the same time, the brightness control unit 106 controls the brightness of images according to the brightness control curve generated in step S207. That is, in a case where the brightness parameter to be changed is the f-stop number, the brightness control unit 106 controls the diaphragm 100b at the predetermined control cycle intervals. In a case where the brightness parameter to be changed is the shutter value, the brightness control unit 106 controls charge accumulation time of the image pickup element 100c at the predetermined control cycle intervals. In a case where the brightness parameter to be changed is the gain value, the brightness control unit 106 controls the gain value of the amplifier 101 at the predetermined control cycle intervals. In a case where the brightness parameter to be changed is the ND filter, the brightness control unit 106 controls a switching device of the ND filter at the predetermined control cycle intervals. The switching device is not illustrated.

Figure 2:
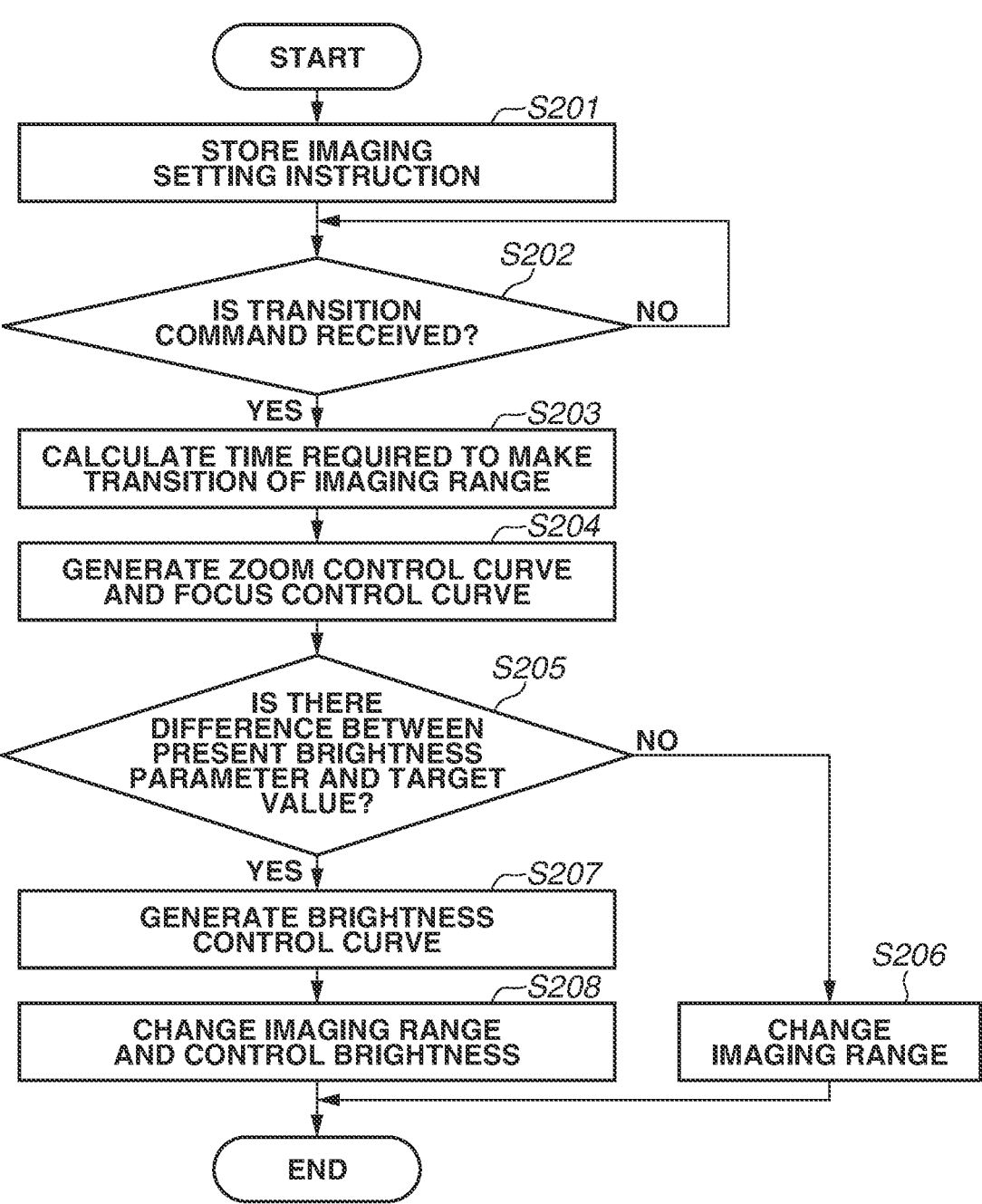
FIG. 2 is a flowchart describing brightness control processing according to the first exemplary embodiment of the disclosure.

In the brightness control processing in FIG. 2, the processing in step S204 is performed immediately before the processing in step S205. However, the processing in step S204 may be performed immediately before the processing in step S206 and immediately before or after the processing in step S207.

Figure 3:
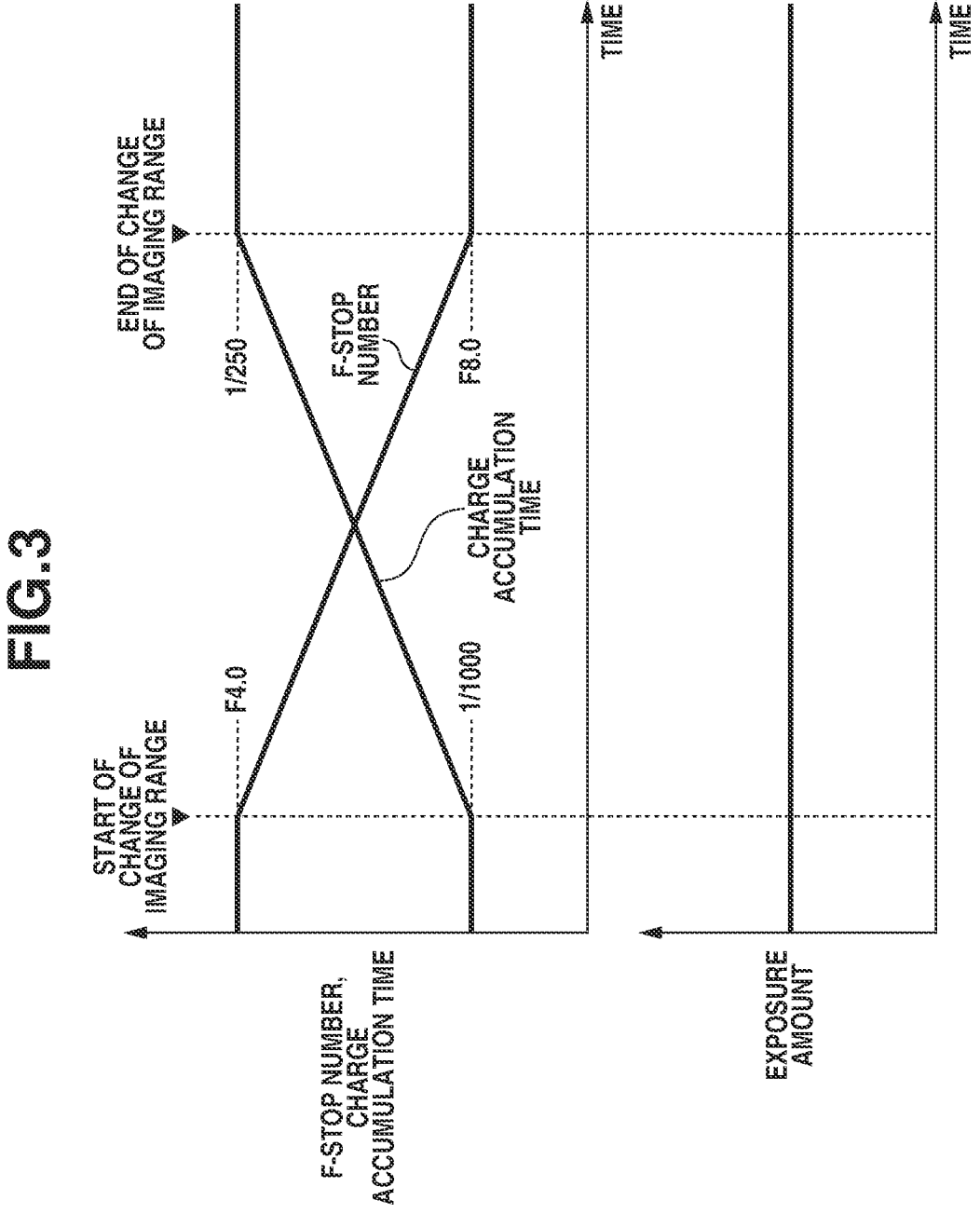
FIG. 3 is a chart indicating an example regarding changes of two brightness parameters controlled by the brightness control processing according to the first exemplary embodiment of the disclosure and a change of an exposure amount.

FIG. 3 is a chart indicating an example regarding changes of two brightness parameters controlled by the brightness control processing in FIG. 2 and a change of the exposure amount. Examples of the two brightness parameters are the f-stop number and the shutter value (charge accumulation time).

The f-stop number and the charge accumulation time at the time of imaging in the present imaging range (first imaging range) are F4.0 and 1/1000, respectively. The target value of the f-stop number and the target value of the charge accumulation time at the time of imaging in the subsequent imaging range (second imaging range) are F8.0 and 1/250, respectively. Thus, the f-stop number should be increased by two stops and the charge accumulation time should be decreased by two stops during the transition of the imaging range.

In step S205 in FIG. 2, a difference in the f-stop number and a difference in the charge accumulation time are detected. In step S207, the camera control unit 105 generates a brightness control curve for the f-stop number and a brightness control curve for the charge accumulation time to maintain speed of fluctuations in brightness of captured images to be constant even when the imaging range is changed. Specifically, at least one of the attitude control unit 108 and the optical control unit 107 monotonically approximates the f-stop number to the target value and monotonically approximates the charge accumulation time to the target value in the whole time to make the transition of the imaging range from the first imaging range to the second imaging range, as illustrated in FIG. 3.

In this case, the brightness control curves to monotonically approximate the two brightness parameters, that is, the f-stop number and the charge accumulation time, to the respective target values at the same time. "At the same time" mentioned herein means that a period to start control of the f-stop number and a period to start control of the charge accumulation time coincide with each other, and a period to end control of the f-stop number and a period to end control of the charge accumulation time also coincide with each other.

In step S208, the brightness control unit 106 controls the brightness of images according to the brightness control curve for the f-stop number and the brightness control curve for the charge accumulation time. Thus, the brightness control unit 106 monotonically approximates the f-stop number to the target value in the whole time to make the transition of the imaging range from the first imaging range to the second imaging range, and monotonically approximates the charge accumulation time to the target value at the same time.

In the example illustrated in FIG. 3, the f-stop number is increased linearly, and the charge accumulation time is decreased linearly. As a result, the exposure amount determined by the f-stop number and the charge accumulation time is constant. In this example, since the gain value of the amplifier 101 and the ND filter are not changed, the brightness of images is constant. Hence, the meaning of "maintain speed of fluctuations in brightness of captured images to be constant" includes meaning that there is no fluctuation in brightness (that is, the speed of fluctuations is zero). In this manner, in the present exemplary embodiment, when the transition of the imaging range is made, it is possible to prevent abrupt fluctuations in brightness of captured images.

Figure 4:
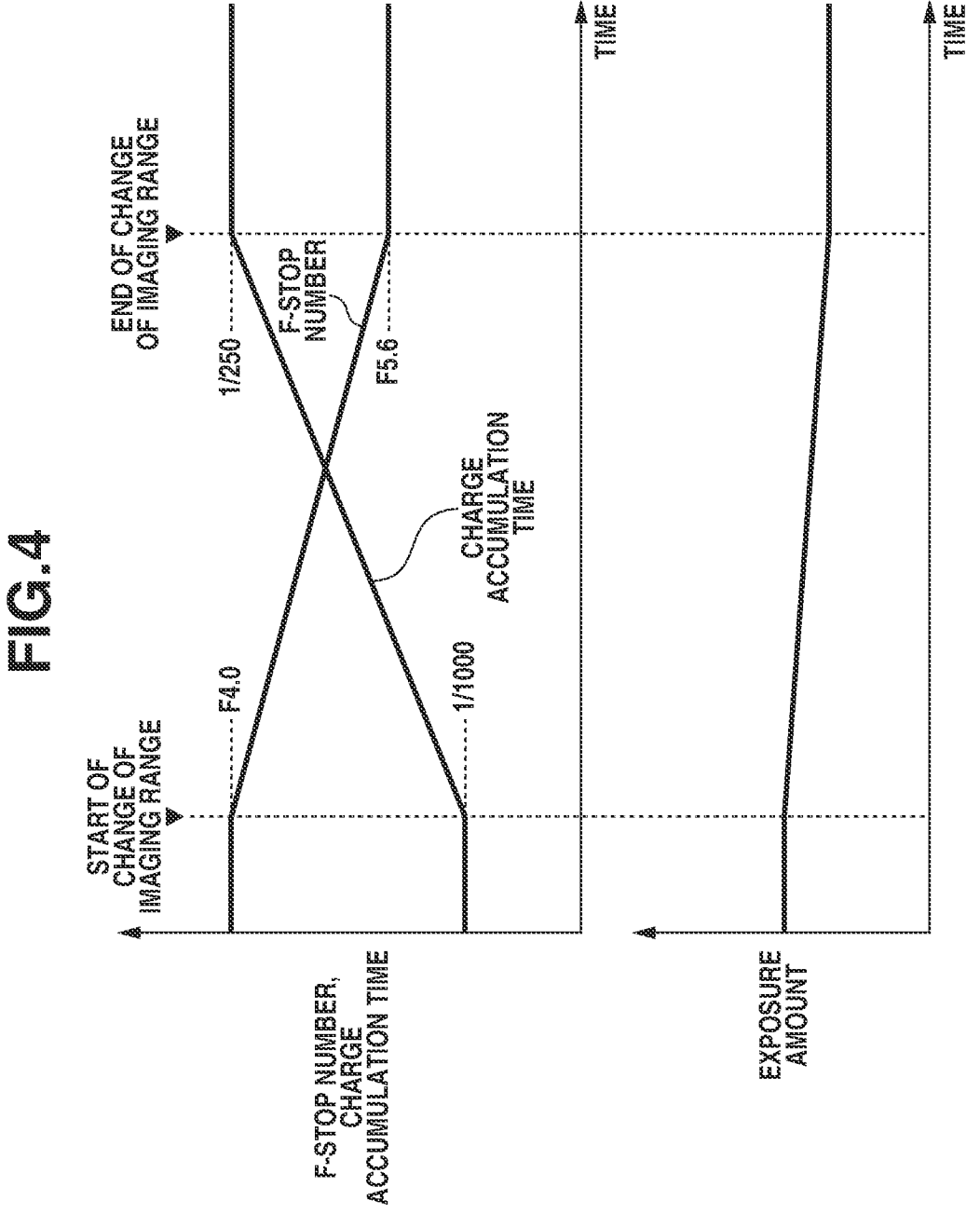
FIG. 4 is a chart indicating another example regarding changes of two brightness parameters controlled by the brightness control processing according to the first exemplary embodiment of the disclosure and a change of an exposure amount.

FIG. 4 is a chart indicating another example regarding changes of two brightness parameters controlled by the brightness control processing in FIG. 2 and a change of the exposure amount. Examples of the two brightness parameters are the f-stop number and the shutter value (charge accumulation time).

The f-stop number and the charge accumulation time at the time of imaging in the present imaging range (first imaging range) are F4.0 and 1/1000, respectively. The target value of the f-stop number and the target value of the charge accumulation time at the time of imaging in the subsequent imaging range (second imaging range) are F5.6 and 1/250, respectively. Thus, the f-stop number should be increased by one stop and the charge accumulation time should be decreased by two stops during the transition of the imaging range.

In step S205 in FIG. 2, a difference in the f-stop number and a difference in the charge accumulation time are detected. In step S207, the camera control unit 105 generates the brightness control curve for the f-stop number and the brightness control curve for the charge accumulation time to maintain speed of fluctuations in brightness of captured images to be constant even when the imaging range is changed. Specifically, at least one of the attitude control unit 108 or the optical control unit 107 monotonically approximates the f-stop number to the target value and monotonically approximates the charge accumulation time to the target value in the whole time to make the transition of the imaging range from the first imaging range to the second imaging range, as illustrated in FIG. 4.

In this case, the brightness control curves to monotonically approximate the two brightness parameters, that is, the f-stop number and the charge accumulation time, to the respective target values at the same time are generated.

In step S208, the brightness control unit 106 controls the brightness of images according to the brightness control curve for the f-stop number and the brightness control curve for the charge accumulation time. Thus, the brightness control unit 106 monotonically approximates the f-stop number to the target value in the whole time to make the transition of the imaging range from the first imaging range to the second imaging range, and monotonically approximates the charge accumulation time to the target value at the same time.

In the example illustrated in FIG. 4, the f-stop number is increased linearly, and the charge accumulation time is decreased linearly. As a result, the exposure amount determined by the f-stop number and the charge accumulation time is increased linearly. In this example, since the gain value of the amplifier 101 and the ND filter are not changed, the brightness of images is also decreased at constant speed. Hence, the meaning of "maintain speed of fluctuations in brightness of captured images to be constant" includes meaning that even if there are fluctuations in the brightness of images, the speed of fluctuations is constant.

In this manner, in the present exemplary embodiment, when the transition of the imaging range is made, it is possible to prevent abrupt fluctuations in brightness of captured images.

In the examples illustrated in FIGS. 3 and 4, the two brightness parameters, that is, the f-stop number and the shutter value (charge accumulation time), are different from the respective target values, and are approximated to the respective target values.

Figure 5:
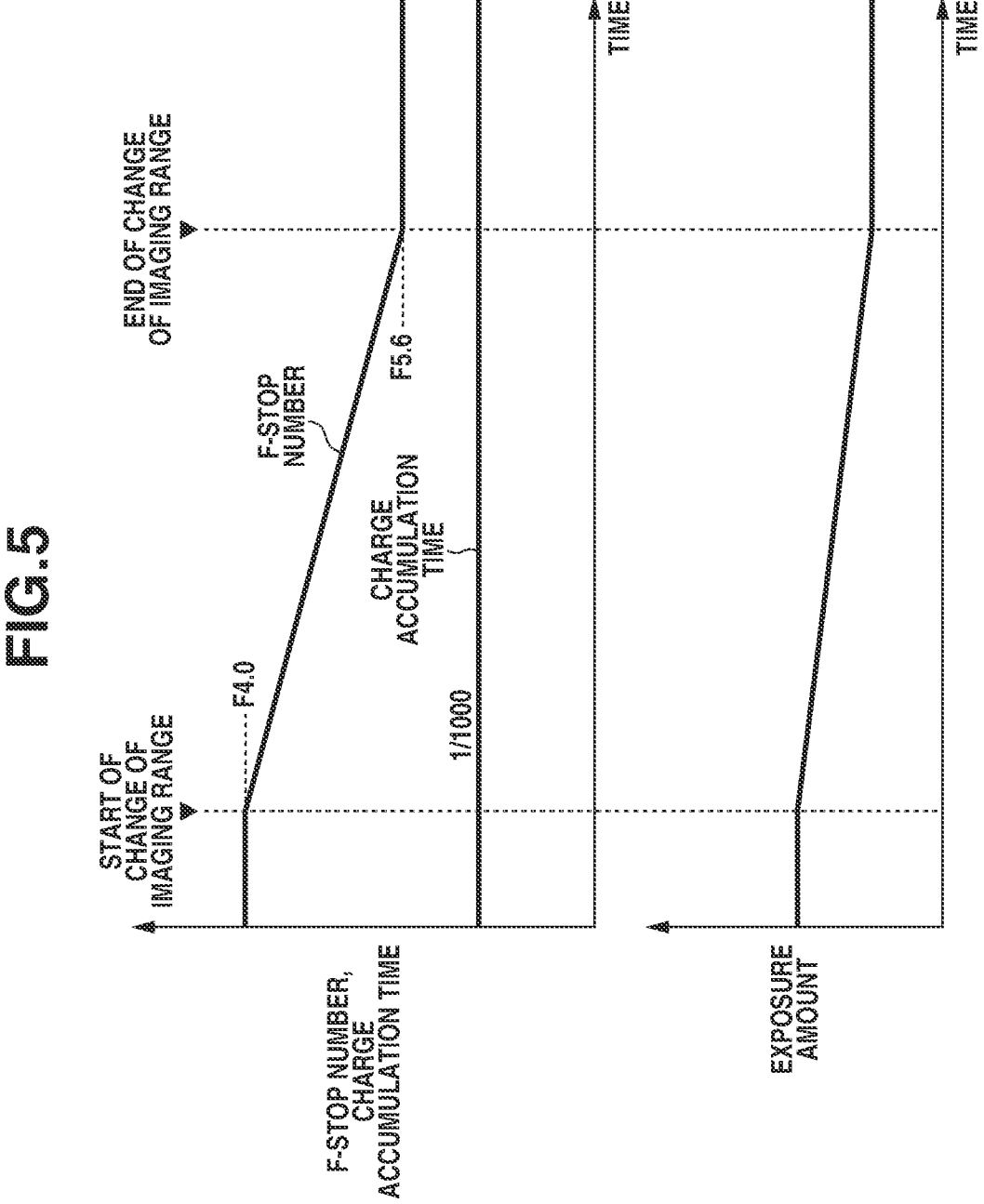
FIG. 5 is a chart indicating an example regarding a change of one brightness parameter controlled by the brightness control processing according to the first exemplary embodiment of the disclosure and a change of an exposure amount.

However, as illustrated in FIG. 5, in a case where one brightness parameter is different from the target value, a difference in this brightness parameter is detected in step S205 in FIG. 2. The f-stop number and the charge accumulation time at the time of imaging in the present imaging range (first imaging range) are F4.0 and 1/1000, respectively. The target value of the f-stop number and the target value of the charge accumulation time at the time of imaging in the subsequent imaging range (second imaging range) are F5.6 and 1/1000, respectively. Thus, the f-stop number should be increased by one stop and the charge accumulation time should be maintained to be constant during the transition of the imaging range.

In step S207, the camera control unit 105 generates the brightness control curve for the f-stop number to maintain the speed of fluctuations in the brightness of captured images to be constant even when the imaging range is changed. Specifically, at least one of the attitude control unit 108 or the optical control unit 107 generates the brightness control curve to monotonically approximate the f-stop number to the target value in the whole time to make the transition of the imaging range from the first imaging range to the second imaging range, as illustrated in FIG. 5.

In step S208, the brightness control unit 106 controls the brightness of images according to the brightness control curve for the f-stop number. Thus, the brightness control unit 106 monotonically approximates the f-stop number to the target value in the whole time to make the transition of the imaging range from the first imaging range to the second imaging range.

In the example illustrated in FIG. 5, the f-stop number is increased linearly, and the charge accumulation time is constant. As a result, the exposure amount determined by the f-stop number and the charge accumulation time is decreased linearly.

In the examples illustrated in FIGS. 3 and 4, the brightness parameters are the f-stop number and the shutter value (charge accumulation time). In the example in FIG. 5, the brightness parameter is the f-stop number.

However, in a case where a difference in the gain value is detected in step S205 in FIG. 2, the camera control unit 105 generates the brightness control curve for the gain value to maintain the speed of fluctuations in the brightness of captured images to be constant in step S207. In step S208, the brightness control unit 106 then controls the brightness of images according to the brightness control curve for the gain value. In a case where a difference in the f-stop number and/or a difference in the shutter value, other than a difference in the gain value, is detected, these two or more brightness parameters are monotonically approximated to the respective target values at the same time.

In a case where a difference in the ND filter is detected in step S205 in FIG. 2, the camera control unit 105 determines a period to switch the ND filter in step S207. Additionally, to maintain the speed of fluctuations in the brightness of captured images to be constant and change any of other brightness parameters at the same time with the period for switching the ND filter, the camera control unit 105 generates a brightness control curve for the other brightness parameter. This prevents abrupt fluctuations in the brightness of captured images even if the ND filter is switched.

The operator preliminarily sets the change of the imaging range and the change of the brightness parameter in the setting apparatus 20. Additionally, the operator merely transmits the transition command from the setting apparatus 20 in a freely selected state during imaging, whereby the imaging apparatus 10 is capable of continuously changing the imaging range and the brightness parameter along with the change of the imaging range. Furthermore, when the transition of the imaging range is made, it is possible to prevent abrupt fluctuations in the brightness of captured images.

Among functions of the imaging apparatus 10 according to the present exemplary embodiment, a function of capturing an image of the object and a function of controlling the exposure (brightness) of the imaging apparatus 10 and the imaging range of the imaging apparatus 10 may be provided separately. For example, the function of controlling the exposure (brightness) of the imaging apparatus 10 and the imaging range of the imaging apparatus 10 may be included in the setting apparatus (control apparatus) 20. In this case, the setting apparatus 20 may acquire an image from the imaging apparatus 10 via the network 30 and control various kinds of functions based on the acquired image.

The above-mentioned control processing can be applied to a setting to change an exposure correction value and a control range of another control value during automatic exposure (AE) control.

Next, a second exemplary embodiment of the disclosure is described. According to the second exemplary embodiment, in the brightness control processing, not only abrupt fluctuations in brightness of captured images are prevented, but also abrupt change of a depth of field is prevented.

As video image expression, there is a case where the depth of field is adjusted at the same time with a change of an angle of view. For example, in a case of reducing the angle of view (performing zoom-in), it is conceivable to make the depth of field shallow to pay attention to a main object. In a case of performing zoom-out, it is conceivable to make the depth of field deep so that the periphery of the main object is not blurred. As described below, the f-stop number as one of the brightness parameters has influence on the depth of field, and there is a case where the change of f-stop number leads to an abrupt change of the depth of field. The present exemplary embodiment prevents the abrupt change of the depth of field.

A configuration of the communication system according to the second exemplary embodiment is the same as that according to the first exemplary embodiment, and thus a description thereof is omitted. Additionally, the brightness control processing according to the second exemplary embodiment can be performed according to the flowchart described in FIG. 2. However, the generation of the brightness control curve in step S207 is performed in consideration of the depth of field.

A depth of field Dof is, for example, calculated by the following Expression (1).

$$Dof \approx \frac{d_0^2 Fc}{f^2 + Fcd_0} + \frac{d_0^2 Fc}{f^2 - Fcd_0} \tag{1}$$

In this Expression, $d_0$ represents an object distance, F represents an f-stop number, c represents a permissible circle of confusion, and f represents a focal length. The permissible circle of confusion c is a known value that can be predetermined from a pixel pitch of the image pickup element 100c or the like. The object distance do can be estimated from the position of the focus lens.

Hence, parameters that determine the depth of field Dof are mainly the f-stop number F and the focal length f.

In this manner, the change of the f-stop number F results in the change of the depth of field Dof. In addition, as obvious from Expression (1), a relationship between these parameters and the depth of field Dof is a non-linear relationship. Hence, as illustrated in FIGS. 3 to 5, in a case where the f-stop number is controlled at constant speed, there is a possibility for an unintended abrupt change of the depth of field Dof.

To address this, in the present exemplary embodiment, in a case where a difference in the f-stop number is detected in step S205, the camera control unit 105 generates a brightness control curve for the f-stop number in consideration of the depth of field in step S207. That is, in a case where there is a difference between the f-stop number at the time of imaging in the first imaging range and the target value of the f-stop number instructed by the brightness instruction, the camera control unit 105 generates the brightness control curve for the f-stop number in consideration of the depth of field.

Specifically, at least one of the attitude control unit 108 or the optical control unit 107 generates the brightness control curve to monotonically approximate the f-stop number to the target value in the whole time to make the transition of the imaging range from the first imaging range to the second imaging range so that the depth of field changes at a constant increase rate or a constant decrease rate. The change of the f-stop number is a monotonic increase or a monotonic decrease.

In step S208, the brightness control unit 106 controls the brightness of images according to the brightness control curve for the f-stop number. Thus, the brightness control unit 106 monotonically approximates the f-stop number to the target value in the whole time to make the transition of the imaging range from the first imaging range to the second imaging range so that the depth of field changes at the constant increase rate or the constant decrease rate.

As described above, parameters that determine the depth of field include the f-stop number F, and the focal length f, and the object distance do. The focal length f depends on the position of the zoom lens, and the object distance do depends on the position of the focus lens. Since the camera control unit 105 determines control values of the positions of the zoom lens and focus lens at every control cycle in step S204, it is possible to determine the control value of the f-stop number F at every control cycle so as to change the depth of field Dof at the constant increase rate or the constant decrease rate in step S207.

Figure 6:
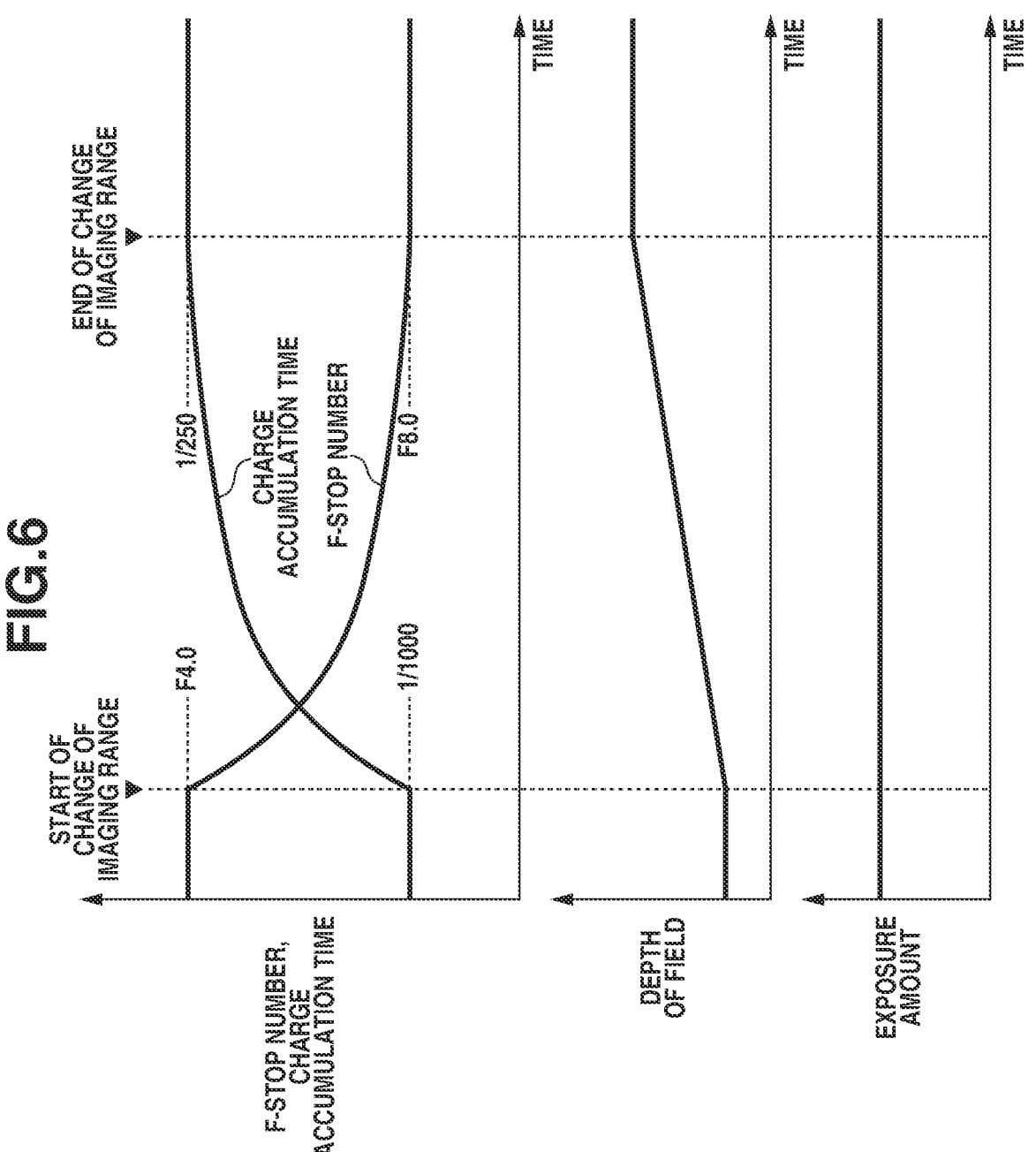
FIG. 6 is a chart indicating an example regarding changes of two brightness parameters controlled by brightness control processing according to a second exemplary embodiment of the disclosure, a change of an exposure amount, and a change of a depth of field.

FIG. 6 is a chart indicating an example regarding changes of the f-stop number and the shutter value controlled by the brightness control processing according to the present exemplary embodiment, a change of the exposure amount along with the changes of the f-stop number and the shutter value, and a change of the depth of field along with the changes of the f-stop number and the shutter value. For simplification, assume that the change of the imaging range is made by panning and tilting without zooming. In the example in FIG. 6, the exposure amount is maintained to be constant similarly to that in FIG. 3, but the speed of fluctuations in the exposure amount may be maintained to be constant as illustrated in FIG. 4. Additionally, in the example illustrated in FIG. 6, the f-stop number and the shutter value are changed, but the f-stop number may be changed similarly to the example in FIG. 5. Other than the f-stop number, at least one of the gain value or the ND filter may be changed.

According to the present exemplary embodiment, since the depth of field changes at a constant change rate, the abrupt change of the depth of field can be prevented, and continuity of video images can be easily maintained.

Next, a third exemplary embodiment of the disclosure is described. According to the first and second embodiments, in the brightness control processing, the brightness parameter is approximated to the target value in the whole time to make the transition of the imaging range from the first imaging range to the second imaging range. However, according to the third exemplary embodiment, in the brightness control processing, the brightness parameter is approximated to the target value in a partial period of the time to make the transition of the imaging range from the first imaging range to the second imaging range.

As video image expression, there is a possibility that at least one of the change of the brightness of images or the change of the depth of field is desired to be concentrated in an arbitrary period of the time to make the transition of the imaging range. For example, there is a conceivable case where the operator wants to gradually change the brightness or the depth of field in an early period during the transition of the imaging range and maintain the brightness or the depth of field to be constant in a later period. In a case where the brightness around the object notably changes at a time point during the transition of the imaging range (a case of a transition from a dimly-lit corridor to a bright room or other cases), it is conceivable that the operator wants to concentrate at least one of the change of the brightness or the change of the depth of field in a period of the notable change.

In the present exemplary embodiment, abrupt fluctuations in at least one of the brightness in images or the depth of field are prevented while characteristics of video images are changed during a partial period of the transition.

A configuration of the communication system according to the third exemplary embodiment is the same as that according to the first exemplary embodiment, and thus a description thereof is omitted. Additionally, the brightness control processing according to the third exemplary embodiment can be performed according to the flowchart described in FIG. 2.

However, in step S207, the camera control unit 105 determines the control value of the brightness parameter at every control cycle so that the change of the brightness parameter to the target value is completed within a period instructed by the operator. In step S208, the brightness control unit 106 performs brightness control on images according to the brightness control curve generated in step S207. Thus, the brightness control unit 106 approximates the brightness parameter to the target value in a partial period of the time in which at least one of the attitude control unit 108 or the optical control unit 107 makes the transition of the imaging range from the first imaging range to the second imaging range.

Figure 7A:
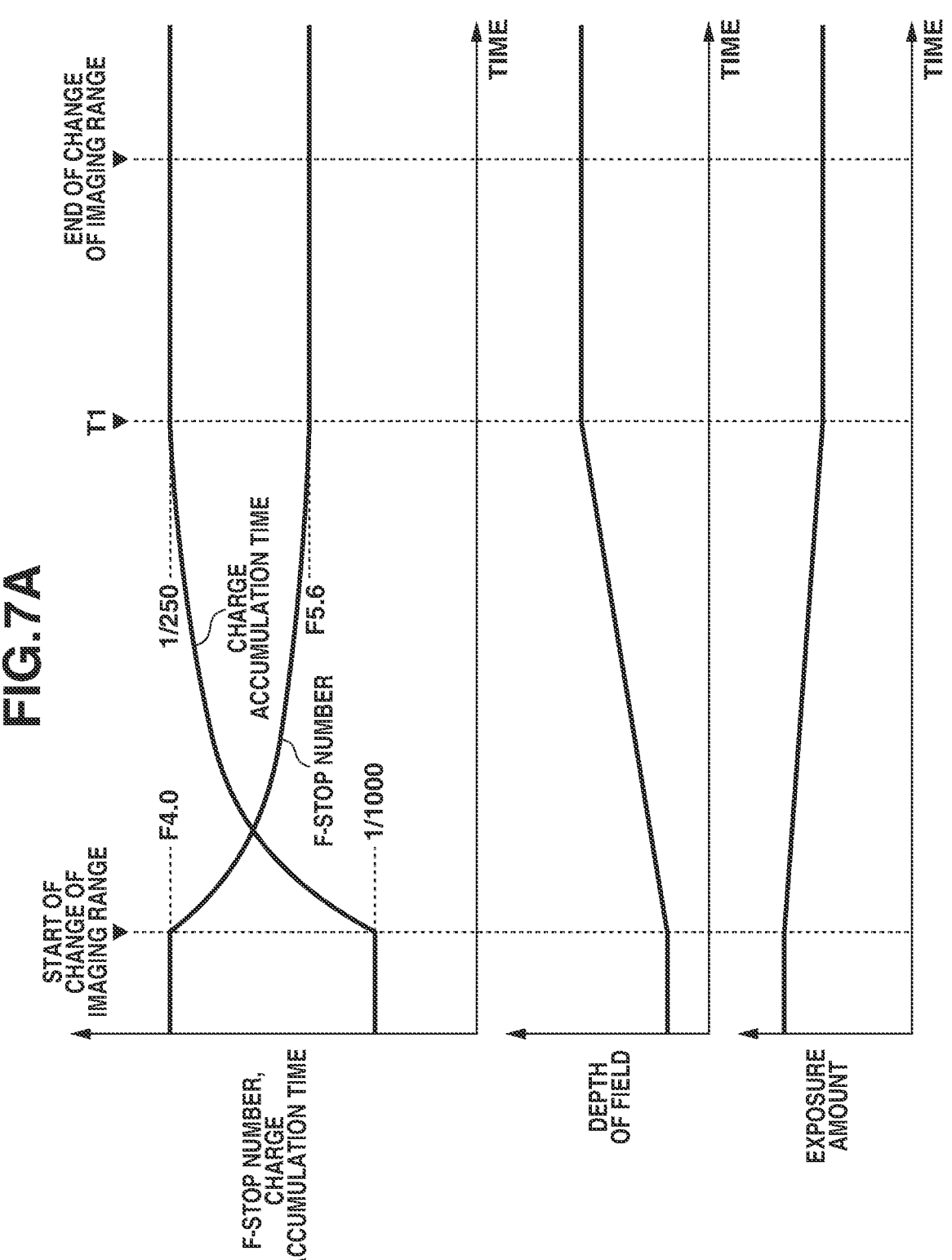
FIG. 7A is a chart indicating an example regarding changes of two brightness parameters controlled by brightness control processing according to a third exemplary embodiment of the disclosure, a change of an exposure amount, and a change of a depth of field.

FIG. 7A illustrates an example regarding changes of two brightness parameters controlled by the brightness control processing according to the present exemplary embodiment (the f-stop number and the shutter value), a change of the exposure amount, and a change of the depth of field. In this example, the brightness and the depth of field are monotonically changed in an early period of the time to make the transition of the imaging range (a period from a time point to start the change of the imaging range to a time point T1 in FIG. 7A), and the brightness and the depth of field are not changed in a later period of the time to make the transition of the imaging range (a period from the time point T1 to a time point to end the change of the imaging range in FIG. 7A).

Figure 7B:
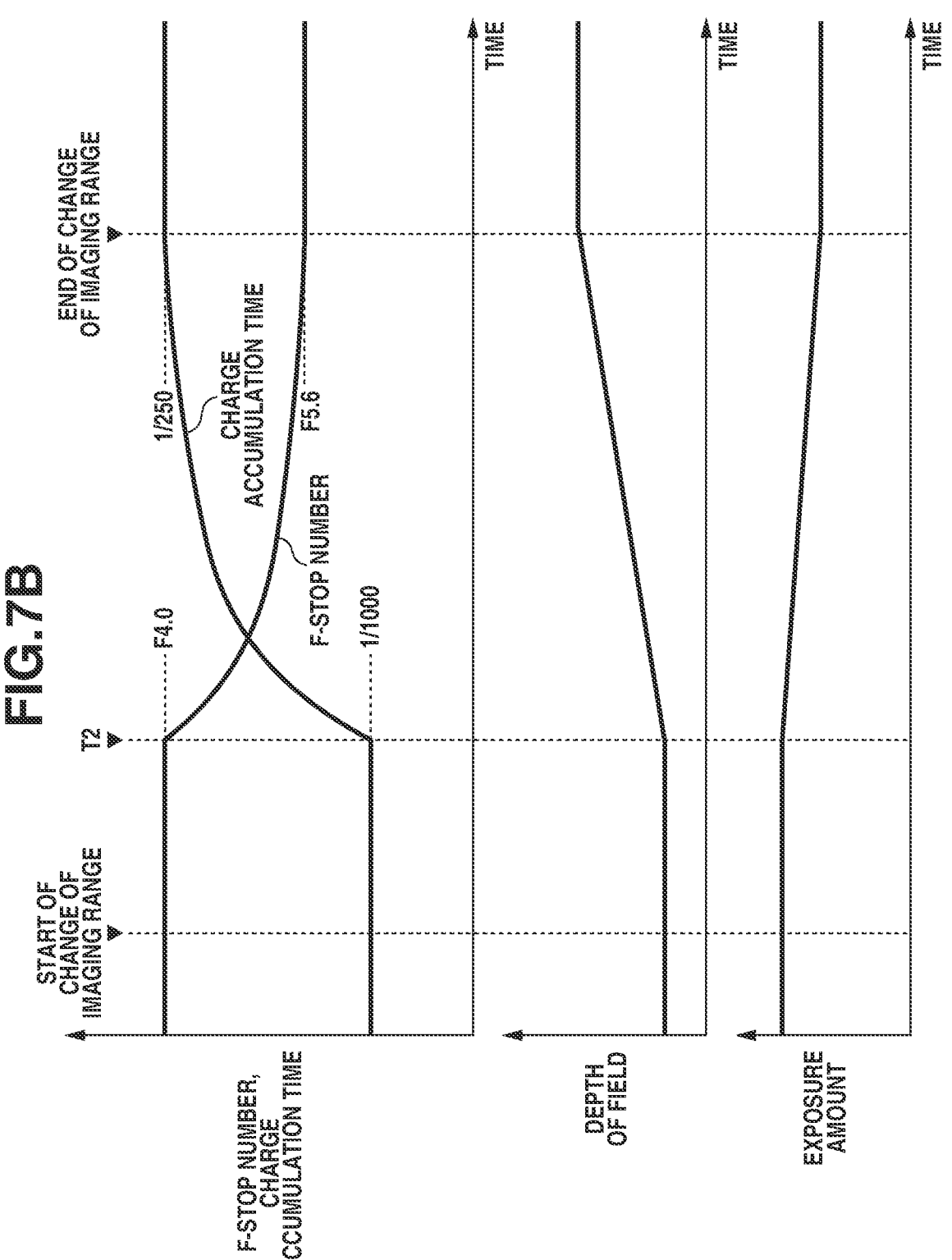
FIG. 7B is a chart indicating another example regarding changes of two brightness parameters controlled by the brightness control processing according to the third exemplary embodiment of the disclosure, a change of an exposure amount, and a change of a depth of field.

FIG. 7B illustrates another example regarding changes of the two brightness parameters controlled by the brightness control processing according to the present exemplary embodiment, a change of the exposure amount, and a change of the depth of field. In this example, the brightness and the depth of field are not changed in an early period of the time to make the transition of the imaging range (a period from a time point to start the change of the imaging range to a time point T2 in FIG. 7B), and the brightness and the depth of field are monotonically changed in a later period of the time to make the transition of the imaging range (a period from the time point T2 to a time point to end the change of the imaging range in FIG. 7B).

Although not illustrated, the brightness and the depth of field may be monotonically changed in a middle period of the time to make the transition of the imaging range, and may not be changed in an initial period and end period of the time to make the transition of the imaging range.

Figure 8A:
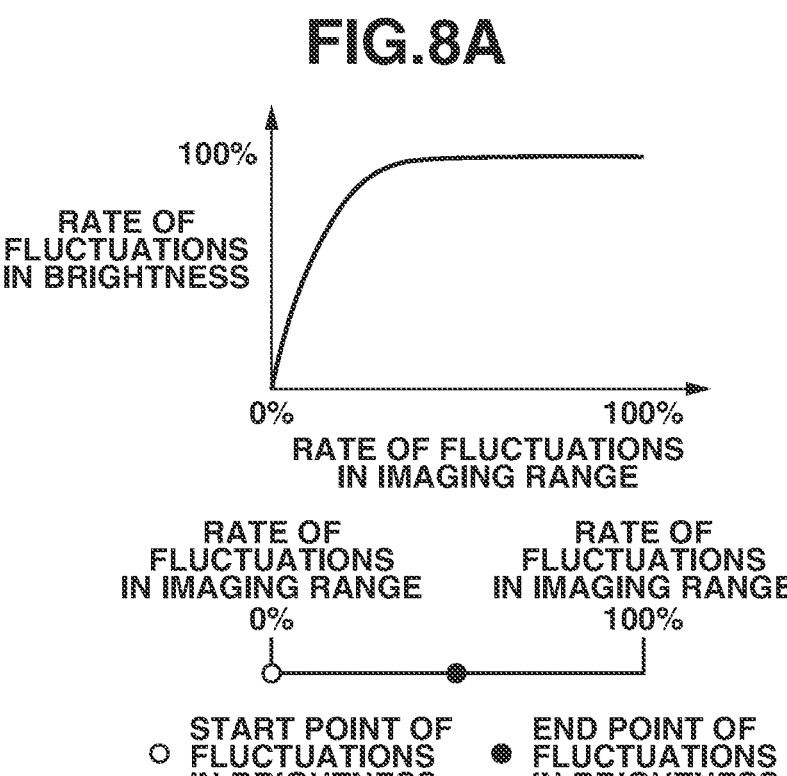
FIG. 8A is a view illustrating a screen displayed on a display device to implement the changes in FIG. 7A.
Figure 8B:
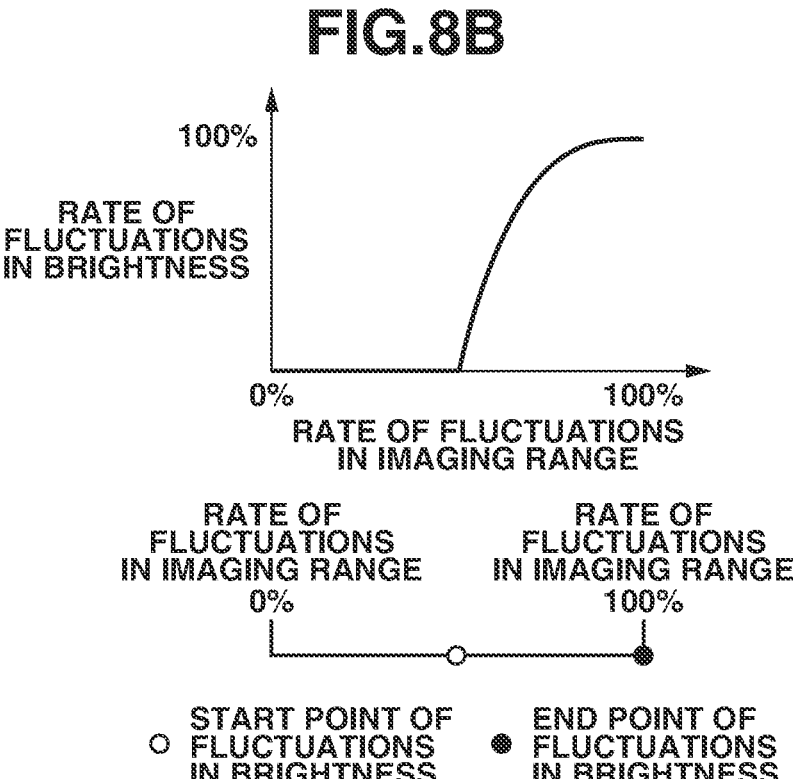
FIG. 8B is a view illustrating a screen displayed on the display device to implement the changes in FIG. 7B.

In the setting apparatus 20, at least one of the change of the brightness of images or the change of the depth of field can be allocated by the operator to an arbitrary period of the time to make the transition of the imaging range. FIG. 8A illustrates an allocation setting screen that is displayed on the display device (not illustrated) of the setting apparatus 20 to implement the changes illustrated in FIG. 7A. FIG. 8B illustrates an allocation setting screen that is displayed on the display device of the setting apparatus 20 to implement the changes illustrated in FIG. 7B.

As illustrated in FIGS. 8A and 8B, each allocation setting screen includes a graph indicating a rate of fluctuations in the brightness with respect to a rate of fluctuations in the imaging range, and a time indicator indicating the start point of fluctuations in the brightness and the end point of fluctuations in the brightness during the period of the fluctuations in the imaging range.

The operator operates a pointing device (for example, a mouse, and a touch panel) to move the start point of the fluctuations in the brightness and the end point of the fluctuations in the brightness in the time indicator on the allocation setting screen.

As illustrated in FIG. 8A, assume that the operator adjusts the start point of the fluctuations in the brightness so that the rate of fluctuations in the imaging is 0% (that is, at the start point of the change of the imaging range), and adjusts the end point of the fluctuations in the brightness so that the rate of the fluctuations in the imaging range is at the center. In this case, like the example in FIG. 7A, it is possible to allocate the change of the brightness and the change of the depth of field to the early period of the time to make the transition of the imaging range. In response to the allocation made by the operator, the graph in FIG. 8A changes so as to indicate that the change of the brightness caused in this case is concentrated in the early period of the time to make the transition of the imaging range. As a result, it is easy to confirm a result of the allocation.

As illustrated in FIG. 8B, in a case where the operator adjusts the start point of the fluctuations in the brightness so that the rate of fluctuations in the imaging range is at the center, and adjusts the end point of the fluctuations in the brightness so that the rate of fluctuations in the imaging range is 100% (that is, at the end point of the change of the imaging range), like the example in FIG. 7B, it is possible to allocate the change of the brightness and the change of the depth of field to the later period of the time to make the transition of the imaging range. In response to the allocation made by the operator, the graph in FIG. 8B changes in a manner indicating that the change of the brightness caused in this case is concentrated in the later period of the time to make the transition of the imaging range. As a result, it is easy to confirm a result of the allocation.

The allocation of the period is included in, for example, the imaging setting instruction transmitted from the setting apparatus 20 to the imaging apparatus 10. Alternatively, the allocation of the period may be transmitted from the setting apparatus 20 to the imaging apparatus 10 at the same time with the transmission of the transition command when the operator causes the setting apparatus 20 to transmit the transition command to the imaging apparatus 10 (refer to step S202 in FIG. 2). In either case, the setting apparatus 20 notifies the imaging apparatus 10 of the allocated period. In the generation of the brightness control curve in step S207, the camera control unit 105 determines the control value for the brightness parameter at every control cycle so that the change of the brightness parameter to the target value is completed within the allocated period.

By arbitrarily setting the period to change the characteristics of images in this manner, it is possible to concentrate the change of images in an arbitrarily selected period during the transition of the imaging range, and perform imaging as intended by the operator.

In the imaging apparatus 10, it is possible to allocate a ratio of a period to approximate the brightness parameter to the target value with respect to the time to make the transition of the imaging range from the first imaging range to the second imaging range (the rate of fluctuations in the imaging range is 100% in FIGS. 8A and 8B). With the setting of the ratio in this manner, when the operator designates one of the start point of the fluctuations in the brightness and the end point of the fluctuations in the brightness, the other thereof is automatically designated.

In the examples illustrated in FIGS. 7A and 7B, the f-stop number and the shutter value are changed, but the f-stop number or the shutter value may be changed. Alternatively, at least one of the gain value or the ND filter may be changed.

In the first to third embodiments, the imaging setting instruction and the transition command are supplied from the external setting apparatus 20 to the imaging apparatus 10. However, the imaging apparatus 10 may include an input unit and the imaging setting instruction, and the transition command may be supplied from the input unit to the imaging apparatus 10.

Figure 9:
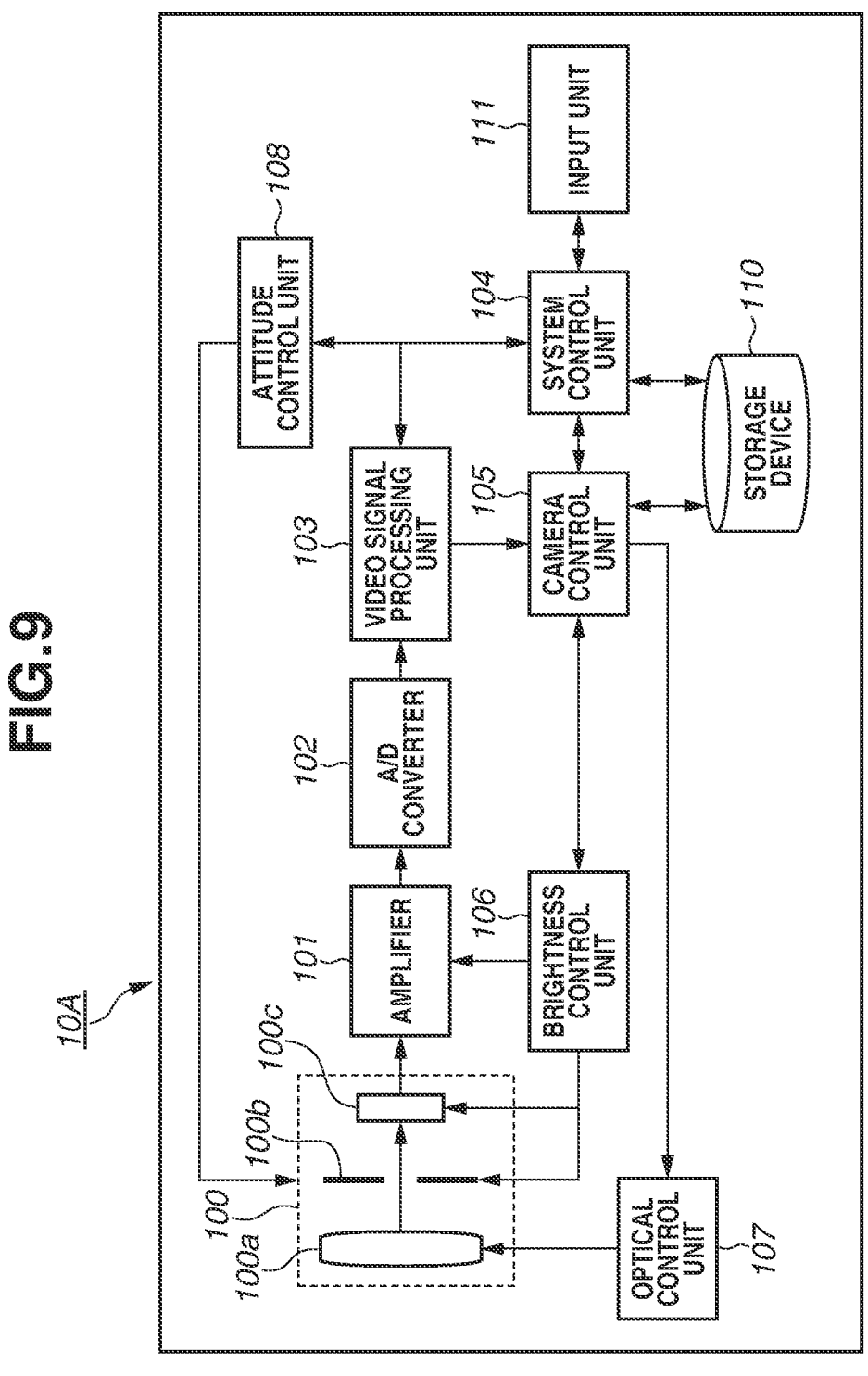
FIG. 9 is a block diagram illustrating an imaging apparatus according to a fourth exemplary embodiment of the disclosure.

FIG. 9 is a diagram illustrating an imaging apparatus 10A according to a fourth exemplary embodiment of the disclosure. The imaging apparatus 10A according to the present exemplary embodiment includes an input unit 111 instead of the communication IF 109.

The input unit 111 may be a keyboard or a mouse, or may be a touch panel. The operator, that is, a user of the imaging apparatus 10A, uses the input unit 111 instead of the setting apparatus 20 to supply the above-mentioned, preliminarily set (preset) imaging setting instruction to the system control unit 104. In addition, the operator uses the input unit 111 instead of the setting apparatus 20 to transmit the transition command for making notification about a timing of the start of the transition to the system control unit 104.

The system control unit 104 preliminarily stores the imaging setting instruction as the preliminary setting information in the storage device 110, and supplies the imaging setting instruction to the video signal processing unit 103 and the camera control unit 105. In this case, the system control unit 104 may read out the group of imaging settings required to make a commanded transition in response to the reception of the transition command, and supply the group of imaging settings to the video signal processing unit 103 and the camera control unit 105. Other features of the imaging apparatus 10A are the same as those of the imaging apparatus 10 according to the first to third exemplary embodiments.

The brightness control processing according to the present exemplary embodiment is the same as the brightness control processing in any one of the first to third exemplary embodiments.

In a case where the brightness control processing the same as that according to the third exemplary embodiment is performed, the allocation setting screen exemplified in each of FIGS. 8A and 8B is displayed on the display device (not illustrated) of the imaging apparatus 10A. The operator operates the input unit 111 to move the start point of fluctuations in the brightness and the end point of fluctuations in the brightness in the time indicator on the allocation setting screen. This allows the operator to allocate at least one of the change of the brightness of images or the change of the depth of field in an arbitrary period within the time to make the transition of the imaging range. That is, it is possible to designate a period to change characteristics of images using the input unit 111.

<Modifications>

The exemplary embodiments of the disclosure have been described, but the above description does not limit the disclosure. Various modifications including deletion, addition, and replacement of a component are conceivable within the technical scope of the disclosure.

In the above-mentioned exemplary embodiments, the imaging apparatus 10 receives, from the setting apparatus 20, the imaging setting instruction including the imaging range change instruction, the focusing instruction, and the brightness instruction, and further including at least one of the instruction regarding time required to make the transition of the imaging range or the instruction regarding speed at the time of making the transition.

However, the imaging apparatus 10 may separately receive, from the setting apparatus 20, the imaging range change instruction, the focusing instruction, the brightness instruction, and the instruction regarding time or the instruction regarding speed. In this case, after part of the imaging setting instruction is received by the imaging apparatus 10, there is a case where part of the rest of the imaging setting instruction is belatedly received by the imaging apparatus 10. Even when the imaging range change instruction is received by the imaging apparatus 10, if the brightness instruction is not received by the imaging apparatus 10 (refer to step S202 in FIG. 2), the above-mentioned brightness control processing cannot be performed. In such a case, in one embodiment, the imaging apparatus 10 waits for reception of the brightness instruction and performs the brightness control processing after receiving the brightness instruction.

The disclosure can be implemented by supplying a program that implements one or more functions of the processor according to the exemplary embodiments in the processor via a network or a storage medium and reading out and executing the program by the processor. In this case, the program (program codes) itself read out from the storage medium implements the functions according to the exemplary embodiments. In addition, a recording medium that records the program can constitute the disclosure.

At least one of the illustrated functional blocks (the video signal processing unit 103, the system control unit 104, the camera control unit 105, the brightness control unit 106, and the optical control unit 107) may be implemented by hardware. In a case where each function block is implemented by hardware, for example, a dedicated circuit can be automatically generated from a program for implementing each step on a field-programmable gate array (FPGA) using a predetermined compiler. Alternatively, each functional block may be implemented as hardware by formation of a gate array circuit similarly to the FPGA. Still alternatively, each functional block may be implemented by an application-specific integrated circuit (ASIC).

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-065623, filed Apr. 13, 2023, which is hereby incorporated by reference herein in its entirety.

What is claimed is:

1. An apparatus configured to control an imaging apparatus, the control apparatus comprising:

at least one processor; and a memory coupled to the at least one processor, the memory storing instructions that, when executed by the at least one processor, cause the at least one processor to:

change an imaging range of the imaging apparatus;

control a plurality of brightness parameters including a first brightness parameter and a second brightness parameter to determine brightness of images captured by the imaging apparatus;

store instruction information including (a) an instruction to make a transition of the imaging range from a first range to a second range, and (b) a first target value of the first brightness parameter and a second target value of the second brightness parameter at time of imaging performed by the imaging apparatus in a case where the imaging range is the second range; and in a case where there is a difference between a value of the first brightness parameter at the time of imaging in the first range and the first target value and in a case where there is a difference between a value of the second brightness parameter at the time of imaging in the first range and the second target value, monotonically approximate the value of the first brightness parameter to the first target value and the value of the second brightness parameter to the second target value in a whole of or a partial period of time to make the transition of the imaging range from the first range to the second range, wherein a start timing of a change of the value of the first brightness parameter is the same as a start timing of a change of the value of the second brightness parameter, and wherein an end timing of the change of the value of the first brightness parameter is the same as an end timing of the change of the value of the second brightness parameter.

2. The apparatus according to claim 1, wherein the first brightness parameter includes an f-stop number, wherein the instruction information further includes a third target value of the f-stop number at the time of imaging performed by the imaging apparatus in the case where the imaging range is the second range, and wherein the instructions cause the at least one processor to, in a case where there is a difference between a value of the f-stop number at the time of imaging in the first range and the third target value, approximate the value of the f-stop number to the third target value so that a depth of field changes at a constant increase rate or a constant decrease rate in the whole of or the partial period of the time to make the transition of the imaging range from the first range to the second range.

3. The apparatus according to claim 1, wherein the instructions cause the at least one processor to:

accept input of a user with respect to the instruction information; and store the accepted instruction information.

4. The apparatus according to claim 1, wherein the instructions cause the at least one processor to approximate the value of the first brightness parameter to the first target value and the value of the second brightness parameter to the second target value in athe partial period of the time to make the transition of the imaging range from the first range to the second range.

5. The apparatus according to claim 4, wherein the instructions cause the at least one processor to set a ratio of the partial period to the time, and approximate the first and second brightness parameters based on the set ratio.

6. The apparatus according to claim 4, wherein the instructions cause the at least one processor to accept input of a user with respect to the partial period.

7. A method comprising:

changing an imaging range of an imaging apparatus;

controlling a plurality of brightness parameters including a first brightness parameter and a second brightness parameter to determine brightness of images captured by the imaging apparatus;

acquiring instruction information including (a) an instruction to make a transition of the imaging range from a first range to a second range, and (b) a first target value of the first brightness parameter and a second target value of the second brightness parameter at time of imaging performed by the imaging apparatus in a case where the imaging range is the second range; and in a case where there is a difference between a value of the first brightness parameter at the time of imaging in the first range and the first target value and in a case where there is a difference between a value of the second brightness parameter at the time of imaging in the first range and the second target value, monotonically approximate the value of the first brightness parameter to the first target value and the value of the second brightness parameter to the second target value in a whole of or a partial period of time to make the transition of the imaging range from the first range to the second range, wherein a start timing of a change of the value of the first brightness parameter is the same as a start timing of a change of the value of the second brightness parameter, and wherein an end timing of the change of the value of the first brightness parameter is the same as an end timing of the change of the value of the second brightness parameter.

8. The method according to claim 7, wherein the first brightness parameter includes an f-stop number, wherein the instruction information further includes a third target value of the f-stop number at the time of imaging performed by the imaging apparatus in the case where the imaging range is the second range, and wherein the method further comprises:

approximating, in a case where there is a difference between a value of an f-stop number included in the first brightness parameter, at the time of imaging in the first range and the third target value, the value of the f-stop number to the third target value so that a depth of field changes at a constant increase rate or a constant decrease rate in the whole of or the partial period of the time to make the transition of the imaging range from the first range to the second range.

9. The method according to claim 7, further comprising:

approximating the value of the first brightness parameter to the first target value and the value of the second brightness parameter to the second target value in athe partial period of the time to make the transition of the imaging range from the first range to the second range.

10. The method according to claim 7, further comprising:

accepting input of a user with respect to the instruction information; and storing the accepted instruction information.

11. A non-transitory computer-readable storage medium storing a program for causing a computer to execute a control method, the method comprising:

changing an imaging range of an imaging apparatus;

controlling a plurality of brightness parameters including a first brightness parameter and a second brightness parameter to determine brightness of images captured by the imaging apparatus;

acquiring instruction information including:

(a) an instruction to make a transition of the imaging range from a first range to a second range; and (b) a first target value of the first brightness parameter and a second target value of the second brightness parameter at time of imaging performed by the imaging apparatus in a case where the imaging range is the second range; and in a case where there is a difference between a value of the first brightness parameter at the time of imaging in the first range and the first target value and in a case where there is a difference between a value of the second brightness parameter at the time of imaging in the first range and the second target value, monotonously approximate the value of the first brightness parameter to the first target value and the value of the second brightness parameter to the second target value in a whole of or a partial period of time to make the transition of the imaging range from the first range to the second range, wherein a start timing of a change of the value of the first brightness parameter is the same as a start timing of a change of the value of the second brightness parameter, and wherein an end timing of the change of the value of the first brightness parameter is the same as an end timing of the change of the value of the second brightness parameter.

12. The non-transitory computer-readable storage medium according to claim 11, wherein the first brightness parameter includes an f-stop number, wherein the instruction information further includes a third target value of the f-stop number at the time of imaging performed by the imaging apparatus in the case where the imaging range is the second range, and wherein the method further comprises:

approximating, in a case where there is a difference between a value of the f-stop number included in the first brightness parameter, at the time of imaging in the first range and the third target value, the value of the f-stop number to the third target value so that a depth of field changes at a constant increase rate or a constant decrease rate in the whole of or the partial period of the time to make the transition of the imaging range from the first range to the second range.

13. The non-transitory computer-readable storage medium according to claim 11, further comprising:

approximating the value of the first brightness parameter to the first target value and the value of the second brightness parameter to the second target value in the partial period of the time to make the transition of the imaging range from the first range to the second range.

14. The non-transitory computer-readable storage medium according to claim 11, further comprising:

accepting input of a user with respect to the instruction information; and storing the accepted instruction information.

* * * * *